United States Patent
Alam et al.

(10) Patent No.: US 9,432,943 B2
(45) Date of Patent: Aug. 30, 2016

(54) ADAPTIVE NETWORK SEARCHING IN OUT-OF-SERVICE SCENARIOS

(71) Applicant: Apple Inc., Cupertino, CA (US)

(72) Inventors: Muhammad A. Alam, San Jose, CA (US); Giri Prassad Deivasigamani, San Jose, CA (US); Gaurav Nukala, Santa Clara, CA (US)

(73) Assignee: Apple Inc., Cupertino, CA (US)

( * ) Notice: Subject to any disclaimer, the term of this patent is extended or adjusted under 35 U.S.C. 154(b) by 213 days.

(21) Appl. No.: 14/152,594

(22) Filed: Jan. 10, 2014

(65) Prior Publication Data
US 2014/0194086 A1    Jul. 10, 2014

Related U.S. Application Data

(60) Provisional application No. 61/751,215, filed on Jan. 10, 2013.

(51) Int. Cl.
*H04W 52/02* (2009.01)
*H04W 48/16* (2009.01)
*H04W 48/18* (2009.01)

(52) U.S. Cl.
CPC ......... *H04W 52/0254* (2013.01); *H04W 48/16* (2013.01); *H04W 52/0241* (2013.01); *H04W 48/18* (2013.01); *H04W 52/0251* (2013.01); *H04W 52/0277* (2013.01); *Y02B 60/50* (2013.01)

(58) Field of Classification Search
CPC .................... H04W 52/0241; H04W 52/0254; H04W 52/0251; H04W 52/0277; H04W 48/16; H04W 48/18; Y02B 60/50

USPC .......................................... 455/405, 574, 566
See application file for complete search history.

(56) References Cited

U.S. PATENT DOCUMENTS

| 2009/0270091 | A1* | 10/2009 | Joshi ..................... | H04W 48/16 455/434 |
| 2009/0289601 | A1* | 11/2009 | Kanade ............ | H04W 52/0277 320/135 |
| 2009/0298437 | A1* | 12/2009 | Hoefel .................. | H04W 48/16 455/67.11 |
| 2011/0294504 | A1* | 12/2011 | Hara ..................... | H04W 48/16 455/434 |
| 2013/0090117 | A1  | 4/2013  | Ngai et al. | |
| 2013/0165113 | A1  | 6/2013  | Oroskar et al. | |
| 2014/0171053 | A1* | 6/2014  | Stephens .......... | H04W 52/0251 455/418 |

* cited by examiner

*Primary Examiner* — Barry Taylor
(74) *Attorney, Agent, or Firm* — Meyertons Hood Kivlin Kowert & Goetzel, P.C.; Jeffrey C. Hood (57) ABSTRACT

Adaptive out-of-service search behavior by a wireless user equipment (UE) device. The UE may perform cellular communications according to a radio access technology (RAT). It may be determined that cellular service according to the RAT is not available. A search algorithm may be selected from at least two possible search algorithms. A search for cellular service according to the RAT may be performed according to the search algorithm. The various possible search algorithms may specify different ratios of time spent scanning for cellular service to time spent sleeping. The selected search algorithm may be chosen based on any or all of an estimated remaining battery life of the UE, a user activity level, user input, or various other considerations.

16 Claims, 6 Drawing Sheets

ADAPTIVE NETWORK SEARCHING IN OUT-OF-SERVICE SCENARIOS

The present application claims benefit of priority to U.S. Provisional Application No. 61/751,215 titled "Adaptive Network Searching in Out-of-Service Scenarios" and filed on Jan. 10, 2013, whose inventors are Muhammad A Alam, Giri Prassad Deivasigamani, and Gaurav Nukala, which is hereby incorporated by reference in its entirety as though fully and completely set forth herein.

FIELD

The present application relates to wireless devices, and more particularly to a system and method for adaptive network searching in out-of-service scenarios by a wireless device.

DESCRIPTION OF THE RELATED ART

Wireless communication systems are rapidly growing in usage. Further, wireless communication technology has evolved from voice-only communications to also include the transmission of data, such as Internet and multimedia content. Many wireless communication technologies, such as cellular communication technologies, are substantially designed to provide mobile communication capabilities to wireless devices, such as cellular phones. Users of such wireless devices may be able to move freely within a service territory of their service provider while using their wireless devices, and the wireless devices may operate in conjunction with the service provider in a manner that accounts for such movement.

It is possible, however, that such a wireless device may on some occasions lose service (e.g., be unable to detect and/or receive signals) from their service provider. For example, if a user of such a wireless device travels to an area outside of the service provider's service territory, or moves into certain locations with poor signal penetration (e.g., an elevator, underground parking, etc.) which would otherwise be within the service provider's service territory, the wireless device may lose service. In such cases ("out-of-service" conditions), the wireless device may start a network search, in order to regain service as soon as possible.

Such network searches/scans for service generally consume a significant amount of power. Particularly for battery powered devices, power consumption is an important consideration: users generally prefer devices which exhibit longer battery life. However, it is common, even for battery powered wireless devices, for network search policies when in out-of-service conditions to be performed according to a static configuration, which does not take into account battery power levels or other variable conditions. Accordingly, improvements in the field would be desirable.

SUMMARY

In light of the foregoing and other concerns, it would be desirable to provide a way for wireless devices to adaptively perform service scans in out-of-service scenarios in a manner that appropriately balances power consumption and battery concerns with device performance. In particular, if a wireless device has a low remaining battery life and/or is not actively being used, it may be desirable to search for service less frequently, for shorter periods of time, and/or with less intensity than if the wireless device has significant battery life reserves and/or is being actively used.

As an example, consider a wireless device which under "normal" out-of-service circumstances initially scans for cellular service for 120 seconds, then (if still out-of-service after the scan) sleeps for 30 seconds before performing another scan. A telescopic search algorithm might be implemented such that each subsequent search/sleep cycle has an increasing periodicity; for example, after the 30 second sleep of the first search/sleep cycle, the subsequent cycle might include 60 seconds of sleeping, and the following cycle might include 90 seconds of sleeping.

In this case, it might be desirable to decrease the proportion of searching-to-sleeping time while in out-of-service scenarios if battery reserves fall below a certain threshold (for example, 10-20%), in order to reduce power consumption and thus extend the battery life. For example, instead of an initial continuous 120 second search, 15 second searches with 30 second sleep interludes could be implemented under such a low-power regime. Alternatively, or in addition, longer sleeping interludes between searches would similarly reduce power consumption.

Service scans could similarly be adapted based on the state of the wireless device. For example, any of various possible activity indicators (e.g., display on/off, application processor active/inactive, etc.) might be considered (either individually or in combination with battery life considerations) to determine how aggressively to search for service in out-of-service conditions. In other words, if the device display is off and/or the application processor is sleeping, this may be an indication that the device may not currently be actively used by a user, and that accordingly there may be no significant downside (e.g., with respect to user experience) to searching for service in a less-aggressive manner.

Further, such adaptive out-of-service network searching practices may also be implemented in devices which are capable of communicating using multiple different cellular communication technologies. For example, some devices may be designed to communicate using CDMA2000 1xRTT for voice communications and LTE for data communications. For such devices, out-of-service network search aggressiveness may be adaptively modified for some or all applicable cellular communication technologies, independently or in a coordinated manner.

Note that while battery levels and device state/activity levels are described as possible examples of considerations based on which to adaptively modify out-of-service network search practices, numerous other bases for adaptive out-of-service network search practices may also or alternatively be used, including combinations of numerous criteria according to various circumstances, as desired. Further, note that while CDMA2000 1xRTT and LTE represent one combination of cellular technologies with reference to which adaptive out-of-service network search practices may be beneficial, similar and/or other benefits may also potentially be derived from such techniques with reference to other cellular systems (and/or combinations of multiple cellular systems), such as GSM, GPRS, UMTS, W-CDMA, TD-SCDMA, LTE-Advanced, etc.

Accordingly, embodiments are presented herein of such a method for a wireless user equipment (UE) device to adapt its out-of-service network search practices and a UE configured to implement the method. The UE may include one or more radios, including one or more antennas, for performing wireless communications with base stations (BSs). The UE may also include device logic (which may include a processor and memory medium and/or hardware logic) configured to implement the method. Embodiments are also presented of a memory medium (e.g., a non-transitory computer accessible memory medium) storing program instructions executable by a processor to perform part or all of the method.

BRIEF DESCRIPTION OF THE DRAWINGS

A better understanding of the present subject matter can be obtained when the following detailed description of the embodiments is considered in conjunction with the following drawings, in which.

While the features described herein may be susceptible to various modifications and alternative forms, specific embodiments thereof are shown by way of example in the drawings and are herein described in detail. It should be understood, however, that the drawings and detailed description thereto are not intended to be limiting to the particular form disclosed, but on the contrary, the intention is to cover all modifications, equivalents and alternatives falling within the spirit and scope of the subject matter as defined by the appended claims.

DETAILED DESCRIPTION

Acronyms

The following acronyms are used in this disclosure:
UE: User Equipment
BS: Base Station
GSM: Global System for Mobile Communication
UMTS: Universal Mobile Telecommunication System
LTE: Long Term Evolution
3GPP: Third generation partnership project
3GPP2: Third generation partnership project 2
CDMA: Code Division Multiple Access Terms The following is a glossary of terms used in this disclosure:

Memory Medium—Any of various types of non-transitory memory devices or storage devices. The term "memory medium" is intended to include an installation medium, e.g., a CD-ROM, floppy disks, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. The memory medium may include other types of non-transitory memory as well or combinations thereof. In addition, the memory medium may be located in a first computer system in which the programs are executed, or may be located in a second different computer system which connects to the first computer system over a network, such as the Internet. In the latter instance, the second computer system may provide program instructions to the first computer for execution. The term "memory medium" may include two or more memory mediums which may reside in different locations, e.g., in different computer systems that are connected over a network. The memory medium may store program instructions (e.g., embodied as computer programs) that may be executed by one or more processors.

Carrier Medium—a memory medium as described above, as well as a physical transmission medium, such as a bus, network, and/or other physical transmission medium that conveys signals such as electrical, electromagnetic, or digital signals.

Programmable Hardware Element—includes various hardware devices comprising multiple programmable function blocks connected via a programmable interconnect. Examples include FPGAs (Field Programmable Gate Arrays), PLDs (Programmable Logic Devices), FPOAs (Field Programmable Object Arrays), and CPLDs (Complex PLDs). The programmable function blocks may range from fine grained (combinatorial logic or look up tables) to coarse grained (arithmetic logic units or processor cores). A programmable hardware element may also be referred to as "reconfigurable logic".

Computer System—any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" can be broadly defined to encompass any device (or combination of devices) having at least one processor that executes instructions from a memory medium.

User Equipment (UE) (or "UE Device")—any of various types of computer systems devices which are mobile or portable and which performs wireless communications. Examples of UE devices include mobile telephones or smart phones (e.g., iPhone™, Android™-based phones), portable gaming devices (e.g., Nintendo DS™, PlayStation Portable™, Gameboy Advance™, iPhone™), laptops, PDAs, portable Internet devices, music players, data storage devices, or other handheld devices, etc. In general, the term "UE" or "UE device" can be broadly defined to encompass any electronic, computing, and/or telecommunications device (or combination of devices) which is easily transported by a user and capable of wireless communication.

Base Station—The term "Base Station" has the full breadth of its ordinary meaning, and at least includes a wireless communication station installed at a fixed location and used to communicate as part of a wireless telephone system or radio system.

Processing Element—refers to various elements or combinations of elements. Processing elements include, for example, circuits such as an ASIC (Application Specific Integrated Circuit), portions or circuits of individual processor cores, entire processor cores, individual processors, programmable hardware devices such as a field programmable gate array (FPGA), and/or larger portions of systems that include multiple processors.

Channel—a medium used to convey information from a sender (transmitter) to a receiver. It should be noted that since characteristics of the term "channel" may differ according to different wireless protocols, the term "channel" as used herein may be considered as being used in a manner that is consistent with the standard of the type of device with reference to which the term is used. In some standards, channel widths may be variable (e.g., depending on device capability, band conditions, etc.). For example, LTE may support scalable channel bandwidths from 1.4 MHz to 20 MHz. In contrast, WLAN channels may be 22 MHz wide while Bluetooth channels may be 1 Mhz wide. Other protocols and standards may include different definitions of channels. Furthermore, some standards may define and use multiple types of channels, e.g., different channels for uplink or downlink and/or different channels for different uses such as data, control information, etc.

Automatically—refers to an action or operation performed by a computer system (e.g., software executed by the computer system) or device (e.g., circuitry, programmable hardware elements, ASICs, etc.), without user input directly specifying or performing the action or operation. Thus the term "automatically" is in contrast to an operation being manually performed or specified by the user, where the user provides input to directly perform the operation. An automatic procedure may be initiated by input provided by the user, but the subsequent actions that are performed "automatically" are not specified by the user, i.e., are not performed "manually", where the user specifies each action to perform. For example, a user filling out an electronic form by selecting each field and providing input specifying information (e.g., by typing information, selecting check boxes, radio selections, etc.) is filling out the form manually, even though the computer system must update the form in response to the user actions. The form may be automatically filled out by the computer system where the computer system (e.g., software executing on the computer system) analyzes the fields of the form and fills in the form without any user input specifying the answers to the fields. As indicated above, the user may invoke the automatic filling of the form, but is not involved in the actual filling of the form (e.g., the user is not manually specifying answers to fields but rather they are being automatically completed). The present specification provides various examples of operations being automatically performed in response to actions the user has taken.

Figure 1:
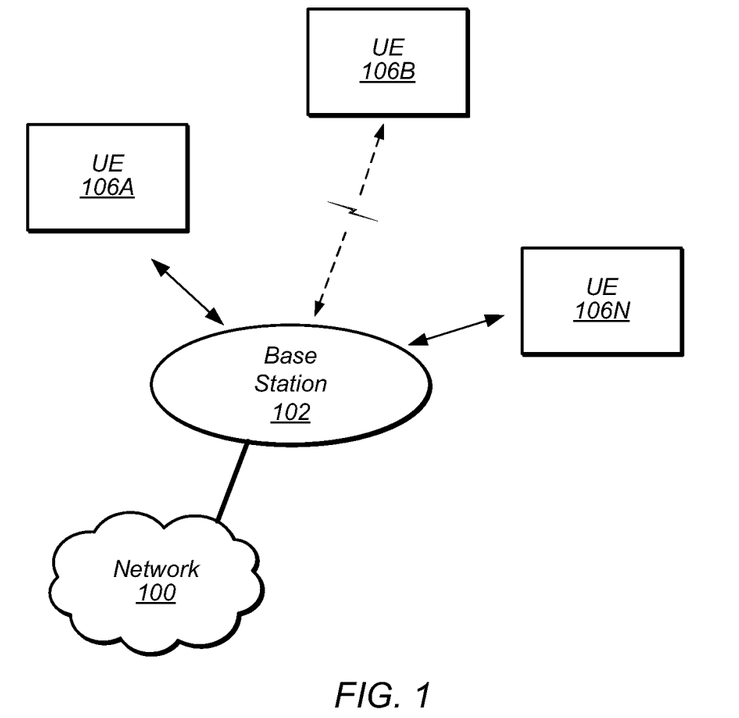
FIG. 1 illustrates an exemplary (and simplified) wireless communication system.
Figure 2:
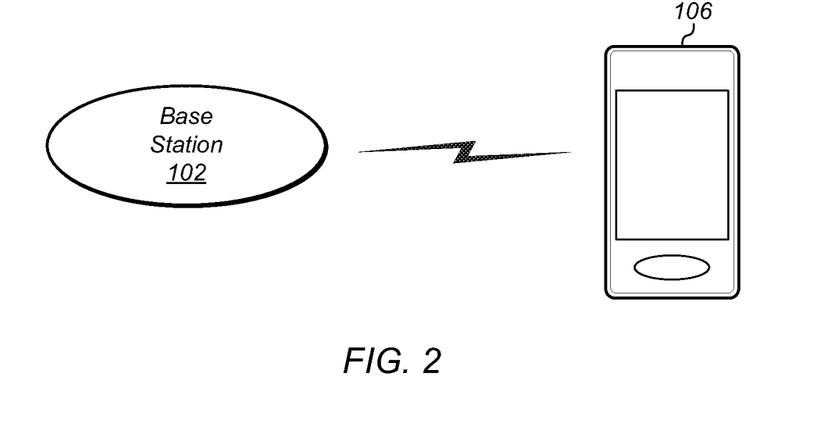
FIG. 2 illustrates a base station (BS) in communication with a user equipment (UE) device.

FIGS. 1 and 2—Communication System

FIG. 1 illustrates an exemplary (and simplified) wireless communication system. It is noted that the system of FIG. 1 is merely one example of a possible system, and embodiments of the invention may be implemented in any of various systems, as desired.

As shown, the exemplary wireless communication system includes a base station 102 which communicates over a transmission medium with one or more user devices 106A, 106B, etc., through 106N. Each of the user devices may be referred to herein as a "user equipment" (UE). Thus, the user devices 106 are referred to as UEs or UE devices.

The base station 102 may be a base transceiver station (BTS) or cell site, and may include hardware that enables wireless communication with the UEs 106A through 106N. The base station 102 may also be equipped to communicate with a network 100 (e.g., a core network of a cellular service provider, a telecommunication network such as a public switched telephone network (PSTN), and/or the Internet, among various possibilities). Thus, the base station 102 may facilitate communication between the user devices and/or between the user devices and the network 100.

The communication area (or coverage area) of the base station may be referred to as a "cell." The base station 102 and the UEs 106 may be configured to communicate over the transmission medium using any of various radio access technologies (RATs), also referred to as wireless communication technologies, or telecommunication standards, such as GSM, UMTS (WCDMA), LTE, LTE-Advanced (LTE-A), 3GPP2 CDMA2000 (e.g., 1xRTT, 1xEV-DO, HRPD, eHRPD), Wi-Fi, WiMAX etc.

Base station 102 and other similar base stations operating according to the same or a different cellular communication standard may thus be provided as a network of cells, which may provide continuous or nearly continuous overlapping service to UEs 106A-N and similar devices over a wide geographic area via one or more cellular communication standards.

Thus, while base station 102 may act as a "serving cell" for UEs 106A-N as illustrated in FIG. 1, each UE 106 may also be capable of receiving signals from (and possibly within communication range of) one or more other cells, which may be referred to as "neighboring cells". Such cells may also be capable of facilitating communication between user devices and/or between user devices and the network 100. Such cells may include "macro" cells, "micro" cells, "pico" cells, and/or cells which provide any of various other granularities of service area size.

Note that a UE 106 may be capable of communicating using multiple wireless communication standards. For example, a UE 106 might be configured to communicate using two or more of GSM, UMTS (WCDMA), TDS-CDMA, CDMA2000 (e.g., 1xRTT, 1xEVDO, HRPD, eHRPD), WiMAX, LTE (including TD-LTE and/or FD-LTE), LTE-A (including TD-LTE-A and/or FD-LTE-A), WLAN, Bluetooth, one or more global navigational satellite systems (GNSS, e.g., GPS or GLONASS), one and/or more mobile television broadcasting standards (e.g., ATSC-M/H or DVB-H), etc. Other combinations of wireless communication standards (including more than two wireless communication standards) are also possible.

As shown (e.g., with respect to UE 106B), it is also possible that a UE 106 may lose service from its serving cell. This may occur due to movement of the UE 106 and/or other objects, interference, congestion, and/or for any of a variety of other reasons. If no other cells are available for the UE 106, that UE 106 may enter (declare) an out-of-service (or "OOS") condition. In this case, the UE 106 may attempt to regain service, for example by periodically or continuously scanning for signals in one or more frequency bands and/or according to one or more wireless communication technologies. The manner in which the UE 106 is configured to attempt to regain service in OOS conditions may depend on the configuration of the UE 106, specifications of one or more wireless communication standards according to which the UE 106 operates, and/or network-specified parameters, among various possibilities. As further described herein, if desired, the UE 106 may be configured to dynamically adapt its OOS network search/scan behavior based on battery levels, user activity indicators, and/or any of various other considerations.

FIG. 2 illustrates user equipment 106 (e.g., one of the devices 106A through 106N) in communication with a base station 102 (e.g., one of the base stations 102A through 102N). The UE 106 may be a device with cellular communication capability such as a mobile phone, a hand-held device, a computer or a tablet, or virtually any type of wireless device.

The UE 106 may include a processor that is configured to execute program instructions stored in memory. The UE 106 may perform any of the method embodiments described herein by executing such stored instructions. Alternatively, or in addition, the UE 106 may include a programmable hardware element such as an FPGA (field-programmable gate array) that is configured to perform any of the method embodiments described herein, or any portion of any of the method embodiments described herein.

In some embodiments, the UE 106 may be configured to communicate using any of multiple radio access technologies/wireless communication protocols. For example, the UE 106 may be configured to communicate using two or more of CDMA2000, LTE, LTE-A, WLAN/Wi-Fi, or GNSS. Other combinations of wireless communication technologies are also possible.

The UE 106 may include one or more antennas for communicating using one or more wireless communication protocols. In some embodiments, the UE 106 may share one or more parts of a receive and/or transmit chain between multiple wireless communication standards. The shared radio may include a single antenna, or may include multiple antennas (e.g., for MIMO) for performing wireless communications. Alternatively, the UE 106 may include separate transmit and/or receive chains (e.g., including separate antennas and other radio components) for each wireless communication protocol with which it is configured to communicate. As a further alternative, the UE 106 may include one or more radios which are shared between multiple wireless communication protocols, and one or more radios which are used exclusively by a single wireless communication protocol. Other configurations are also possible.

Figure 3:
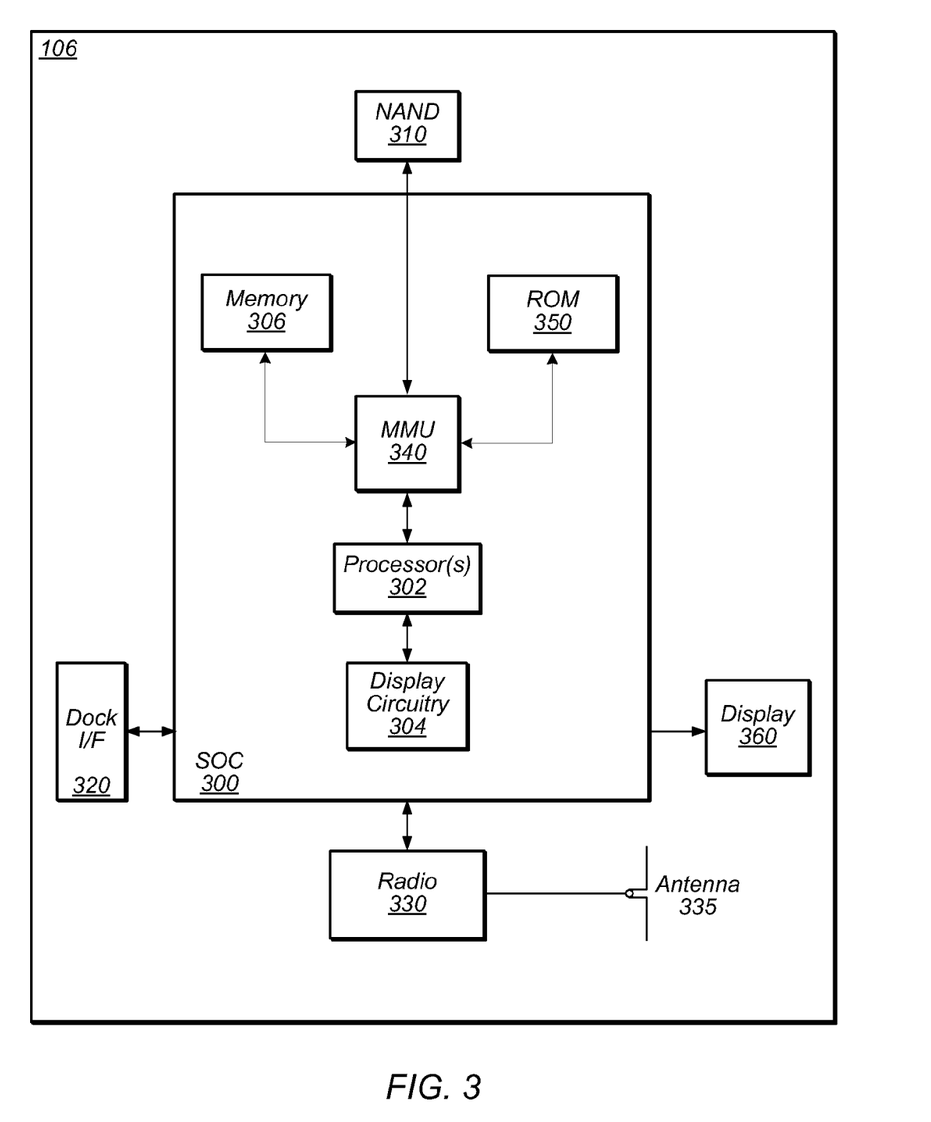
FIG. 3 illustrates an exemplary block diagram of a UE.

FIG. 3—Exemplary Block Diagram of a UE

FIG. 3 illustrates an exemplary block diagram of a UE 106. As shown, the UE 106 may include a system on chip (SOC) 300, which may include portions for various purposes. For example, as shown, the SOC 300 may include processor(s) 302 which may execute program instructions for the UE 106 and display circuitry 304 which may perform graphics processing and provide display signals to the display 360. The processor(s) 302 may also be coupled to memory management unit (MMU) 340, which may be configured to receive addresses from the processor(s) 302 and translate those addresses to locations in memory (e.g., memory 306, read only memory (ROM) 350, NAND flash memory 310) and/or to other circuits or devices, such as the display circuitry 304, radio 330, connector I/F 320, and/or display 360. The MMU 340 may be configured to perform memory protection and page table translation or set up. In some embodiments, the MMU 340 may be included as a portion of the processor(s) 302.

As shown, the SOC 300 may be coupled to various other circuits of the UE 106. For example, the UE 106 may include various types of memory (e.g., including NAND flash 310), a connector interface 320 (e.g., for coupling to a computer system, dock, charging station, etc.), the display 360, and wireless communication circuitry 330 (e.g., for CDMA 2000, LTE, Wi-Fi, GPS, etc.).

The UE device 106 may include at least one antenna, and possibly multiple antennas, for performing wireless communication with base stations and/or other devices. For example, the UE device 106 may use antenna 335 to perform the wireless communication. As noted above, the UE may be configured to communicate wirelessly using multiple wireless communication standards in some embodiments.

The UE 106 may also include and/or be configured for use with one or more user interface elements. The user interface elements may include any of various elements, such as display 360 (which may be a touchscreen display), a keyboard (which may be a discrete keyboard or may be implemented as part of a touchscreen display), a mouse, a microphone and/or speakers, one or more cameras, one or more buttons, one or more proximity sensing elements, and/or any of various other elements capable of providing information to a user and/or receiving/interpreting user input.

As described further subsequently herein, the UE 106 may include hardware and software components for implementing features for adaptively modifying network search behavior in out-of-service conditions, such as those described herein with reference to, inter alia, FIG. 5. The processor 302 of the UE device 106 may be configured to implement part or all of the methods described herein, e.g., by executing program instructions stored on a memory medium (e.g., a non-transitory computer-readable memory medium). In other embodiments, processor 302 may be configured as a programmable hardware element, such as an FPGA (Field Programmable Gate Array), or as an ASIC (Application Specific Integrated Circuit). Alternatively (or in addition) the processor 302 of the UE device 106, in conjunction with one or more of the other components 300, 304, 306, 310, 320, 330, 335, 340, 350, 360 may be configured to implement part or all of the features described herein, such as the features described herein with reference to, inter alia, FIG. 5.

Figure 4:
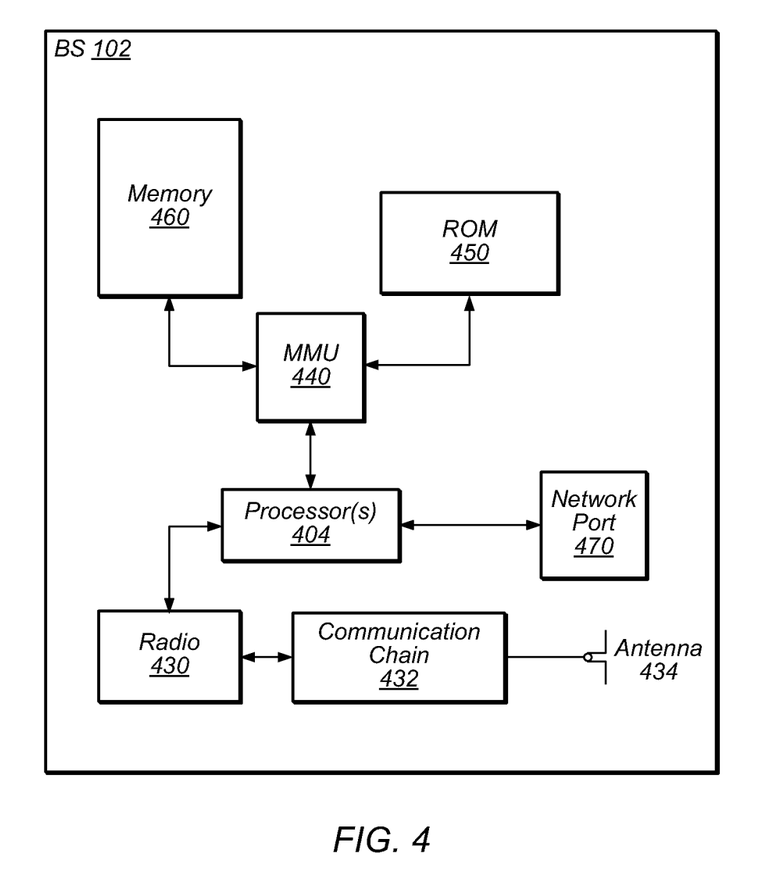
FIG. 4 illustrates an exemplary block diagram of a BS.

FIG. 4—Exemplary Block Diagram of a Base Station

FIG. 4 illustrates an exemplary block diagram of a base station 102. It is noted that the base station of FIG. 4 is merely one example of a possible base station. As shown, the base station 102 may include processor(s) 404 which may execute program instructions for the base station 102. The processor(s) 404 may also be coupled to memory management unit (MMU) 440, which may be configured to receive addresses from the processor(s) 404 and translate those addresses to locations in memory (e.g., memory 460 and read only memory (ROM) 450) or to other circuits or devices.

The base station 102 may include at least one network port 470. The network port 470 may be configured to couple to a telephone network and provide a plurality of devices, such as UE devices 106, access to the telephone network as described above in FIGS. 1 and 2.

The network port 470 (or an additional network port) may also or alternatively be configured to couple to a cellular network, e.g., a core network of a cellular service provider. The core network may provide mobility related services and/or other services to a plurality of devices, such as UE devices 106. In some cases, the network port 470 may couple to a telephone network via the core network, and/or the core network may provide a telephone network (e.g., among other UE devices serviced by the cellular service provider).

The base station 102 may include at least one antenna 434, and possibly multiple antennas. The at least one antenna 434 may be configured to operate as a wireless transceiver and may be further configured to communicate with UE devices 106 via radio 430. The antenna 434 communicates with the radio 430 via communication chain 432. Communication chain 432 may be a receive chain, a transmit chain or both. The radio 430 may be configured to communicate via various wireless telecommunication standards, including, but not limited to, LTE, LTE-A, TDS-CDMA, WCDMA, CDMA2000, etc.

The processor 404 of the base station 102 may be configured to implement part or all of the methods described herein, e.g., by executing program instructions stored on a memory medium (e.g., a non-transitory computer-readable memory medium). Alternatively, the processor 404 may be configured as a programmable hardware element, such as an FPGA (Field Programmable Gate Array), or as an ASIC (Application Specific Integrated Circuit), or a combination thereof.

Figure 5:
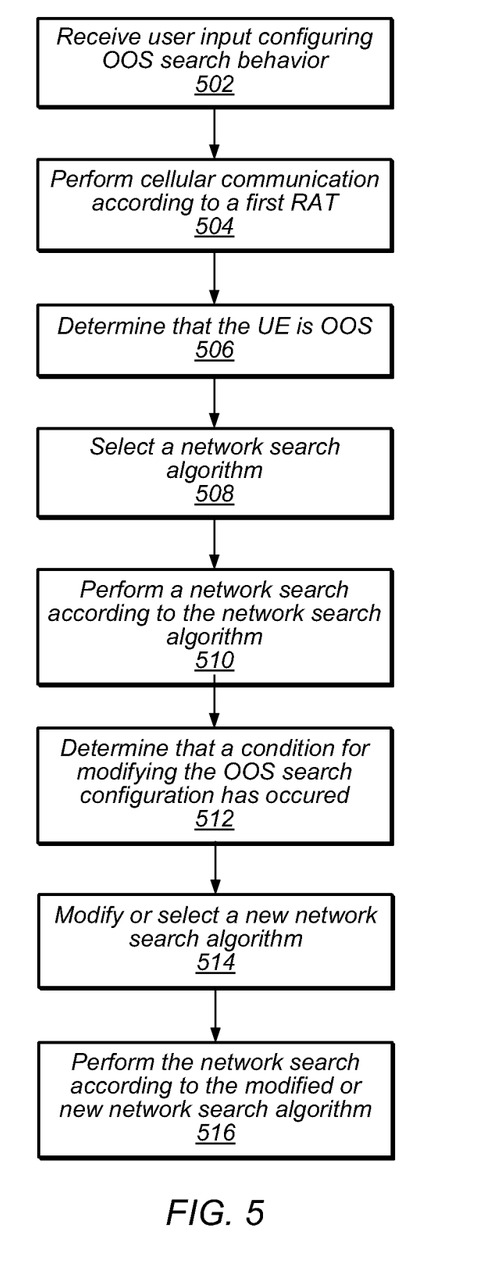
FIG. 5 is a flowchart diagram illustrating an exemplary method for a UE to adaptively modify OOS network search behavior.

FIG. 5—Flowchart

As briefly noted hereinabove with respect to FIG. 1, there may be some scenarios in which a wireless UE device 106 may abruptly lose cellular service and go "out-of-service" (or "OOS"). For example, it may be common for cellular signals to be unable to (or weakly) penetrate elevators, underground car parking, and other relatively shielded locations. A UE 106 which is taken into such a relatively shielded location may be unable to successfully maintain (or obtain) a cellular link with a base station, and thus go OOS. A UE 106 might similarly go OOS if the UE 106 is taken outside its cellular service boundaries, for example, in a wilderness area with no nearby base stations, or while flying in an airplane (e.g., if a user of the UE 106 forgot to power down their UE 106 before airplane takeoff).

Under these circumstances (i.e., when a UE 106 goes OOS), the UE 106 may initiate a network search. An OOS network search may include alternately actively scanning one or more frequency bands for cellular service and "sleeping" (e.g., with one or more components, such as radio and/or baseband components, powered down).

The portions of the network search during which the UE 106 is actively scanning for cellular service may consume a considerable amount of battery. Since it may generally be highly desirable for a UE 106 to obtain cellular service whenever it is available (e.g., since users may generally prefer to be able to use the cellular communication capability of their UEs 106), UEs 106 may commonly be configured to perform such network searches relatively aggressively. For example, a "normal" search configuration might specify a relatively high proportion of time spent scanning for service (at least initially) compared to the amount of time spent sleeping between such scans.

However, there are also scenarios in which it may be desirable to perform a less aggressive network search. For example, if the UE 106 has low remaining battery reserves, an aggressive network search may quickly deplete the battery reserves of the UE 106. Furthermore, if the UE 106 is not actively being used, there may be minimal or no benefit to aggressively attempting to regain service immediately. Additionally, if a user of a UE 106 knows that they are in a situation in which it does not make sense to aggressively search for cellular service, it may be desirable to provide an option for the UE 106 to perform a less aggressive network search based on user input.

Similarly, there may be situations in which it may be desirable to perform an even more aggressive network search. For example, if the UE 106 has ample battery reserves and/or is connected to an external power source (such as a car charger, an outlet provided on a train, etc.) such that power consumption/battery life is a less significant consideration, there may be minimal downside to aggressively attempting to regain cellular service. In addition, if a user of a UE 106 knows that they are in a situation in which cellular service is particularly desirable, it may be desirable to perform a more aggressive network search.

Accordingly, it may (at least in some instances) be desirable to provide a way for a UE 106 to adaptively modify its OOS network search behavior. FIG. 5 is a flowchart diagram illustrating such a method for a UE 106 to adaptively modify its OOS network search behavior. The method shown in FIG. 5 may be used in conjunction with any of the computer systems or devices shown in the above Figures, among other devices. In various embodiments, some of the method elements shown may be performed concurrently, in a different order than shown, or may be omitted. Additional method elements may also be performed as desired. As shown, this method may operate as follows.

In 502, user input configuring OOS search behavior of the UE 106 may be received. The user input may be received in any of a variety of ways, including via one or more user interface elements in a user interface provided at the UE 106 via a display, via an audio user interface (e.g., by receiving and interpreting audible instructions by the user), via one or more gestures (potentially including gestures on a touchscreen and/or proximity gestures), and/or in any of various ways. Exemplary user interface options and possibilities are also further described hereinbelow with respect to FIGS. 7-8.

The user input may configure OOS search behavior of the UE 106 by specifying one or more conditions for adaptively modifying OOS search behavior of the UE 106 and/or by specifying at least two possible search configurations for performing OOS network searches.

The condition(s) for modifying OOS search behavior of the UE 106 may be based on battery reserve levels of the UE 106, user activity levels, and/or any of a variety of other considerations. For example, one condition that might be configured could include crossing a battery level threshold. In this case, if the battery reserves of the UE 106 are below the battery level threshold (and possibly if the UE 106 is also not connected to an external power source such as a charging station), the UE 106 might implement one (a "first") search configuration, while if the battery reserves of the UE 106 are above the battery level threshold (or possibly if the UE 106 is connected to an external power source such as a charging station), the UE 106 might implement a different ("second") search configuration. If desired, multiple such battery level thresholds may be defined, with each of multiple defined battery level ranges corresponding to different search configurations.

To extend the example, further refinements to the OOS search behavior of the UE 106 may be implemented based on user activity if desired. For example, any of various user activity indicators may be monitored by the UE 106, and so conditions based on the status(es) of such user activity indicator(s) may be configured. Thus depending on a power state (e.g., on or off) of a display of the UE 106, a power state (e.g., sleeping or active) of an application processor of the UE 106, the presence or absence of active user-initiated (and/or background) data transfers, and/or any other desired user activity indicators, further search configurations (or sub-configurations of already defined search configurations) may be defined. Alternatively, if desired, user activity level indicators may be used to define one or more conditions for modifying OOS search behavior of the UE 106 and/or corresponding search configurations independently of battery/power consumption based conditions and/or configurations. Further, any number of other factors may alternatively (or also) be used to configure conditions for modifying OOS search behavior of the UE 106 corresponding search configurations instead of (or in addition to) the above-provided examples of battery level thresholds and user activity level indicators.

Note also that, in addition to or instead of a combination of discrete threshold- and/or state-based conditions and corresponding search configurations, other means of configuring OOS search behavior of the UE 106 may also or alternatively be used. For example, as noted above, battery level may be one possible consideration in determining/configuring OOS search behavior. At least in some configurations, battery levels may be estimated as ranging in a continuous manner from 100% (full battery) to 0% (no battery). Accordingly, if desired, instead of using discretely quantized battery threshold levels as a basis for adaptively modifying the OOS search configuration/algorithm used by the UE 106, one or more equations which directly utilize the estimated battery reserve level could be configured. For example, the estimated remaining battery life of the UE 106 (e.g., an integer between 1 and 100) could be used as an input variable in an equation (or set of equations) defining the OOS search configuration/algorithm used by the UE 106.

As previously noted, a UE 106 may be configured to communicate according to multiple wireless communication protocols. In particular, it may be possible for a UE 106 to be configured to communicate according to multiple cellular radio access technologies (RATs). Accordingly, it may further be possible for a user to configure adaptive OOS search behavior (e.g., such as described above, among various possibilities) for their UE 106 individually for each RAT according to which the UE 106 is configured to communicate, or in combination. For example, user interface options might be provided for modifying the aggressiveness of OOS searches for each RAT separately, and/or for modifying the aggressiveness of OOS searches for all RATs according to which the UE 106 is configured to operate as a group.

Note also that if desired, a UE 106 may be pre-configured (e.g., configured for default operation) to perform OOS network searches in an adaptive manner, such that user input configuring the UE 106 for adaptive OOS network searches may not be necessary for the UE 106 to implement adaptive OOS network search behavior. In this case, it may still be possible that user input configuring the OOS network search behavior of the UE 106 may be received, and that the OOS network search behavior of the UE 106 may be re-configured (modified) based on the user input. However, if desired, a UE 106 may alternatively be pre-configured to adapt its OOS network search behavior based on certain pre-configured options in a manner such that user re-configuration (modification of the pre-configuration) may not be enabled.

In 504, cellular communication may be performed according to a first RAT. In order to perform cellular communications, the UE 106 may select a cell on which to camp and establish a wireless link with that cell. The cell may operate according to a cellular RAT such as GSM, TD-SCDMA, W-CDMA, LTE, CDMA2000 (1xRTT, 1xEV-DO), etc. The cell may accordingly be provided by a base station 102 and may provide a connection to a core network, e.g., of a cellular service provider, with which a user of the UE 106 may have a subscription and/or other agreement to provide cellular service. The base station 102 may operate in conjunction with numerous other base stations (which may provide other cells) and other network hardware and software to provide continuous (or nearly continuous) overlapping wireless service over a wide geographic area.

The first cell may be selected from among one or more cells within wireless communication range of the UE 106, which may be provided by nearby base stations. The UE 106 may be capable of discovering, detecting signals from, and possibly communicating with some or all of these neighboring cells, e.g., depending on signal strength/quality, permission, technological interoperability, etc. The first cell may be selected from the cells within wireless communication range of the UE 106 on the basis of one or more signal strength and/or signal quality measurements of the first cell and/or other nearby cells, among other possible criteria (e.g., wireless traffic congestion of the cell(s), operator of the cell(s), wireless technology according to which the cell(s) operate, etc.).

The first cell may be selected as an initial cell selection, e.g., upon powering on the UE 106 (or possibly after powering on a radio of the UE 106, e.g., upon exiting a limited-operation or "airplane mode"), according to some embodiments. Alternatively, the first cell may be selected as part of a cell re-selection procedure. For example, the UE 106 may perform a cell re-selection procedure to select a new cell (e.g., the first cell) with better signal strength and/or quality based on experiencing degraded signal strength and/or quality on a previous serving cell, e.g., as a result of moving from a service area of the previous serving cell to a service area of the first cell.

Performing cellular communications according to the first RAT may include performing active (e.g., RRC_connected mode based) voice and/or data communications, and/or simply maintaining a minimal (e.g., RRC_idle mode) connection with the cellular network. Thus at various times, it may be possible that active, user-initiated data transfers (e.g., voice and/or other "foreground" application data) are in progress, or that only background data transfers or no data transfers are in progress.

Note that if the UE 106 is configured to communicate according to multiple RATs, the UE 106 may also perform cellular communication according to a second RAT. For example, some devices may be configured to use one RAT for voice communications (e.g., a circuit-switched RAT, such as 3GPP2 CDMA 2000 1xRTT) and another RAT for data communications (e.g., a packet-switched RAT, such as 3GPP LTE). Other combinations and configurations of multiple RATs are of course also possible.

In 506, it may be determined that the UE 106 is OOS. The UE 106 may be OOS if cellular communication with the first cell or any other cell cannot be maintained (or obtained). In other words, the wireless/cellular link with the serving cell may be broken. As noted above, this may occur for any of a variety of reasons (e.g., entering an elevator or parking garage, travelling to a remote area, etc.) whose underlying causes may include line-of-sight impediments/shielding, interference, congestion, distance, and/or any of various other causes.

Note that if the UE 106 is configured to communicate using multiple cellular RATs, it may be possible that the UE 106 is OOS with respect to one (or more) RAT(s) while still receiving service with respect to another (or more than one other) RAT (e.g., if there is a nearby base station operating according to the first RAT but no nearby base station operating according to the second RAT), or that the UE 106 may go OOS with respect to all RATs at the same time.

In 508, based on determining that the UE 106 is OOS, a ("first") network search algorithm/configuration may be selected. As noted above, a UE 106 which performs a network search (a search for cellular service) may alternate between operation in an active ("waking") state and an inactive ("sleeping") state. For example, a network search configuration might generally include, upon determining the UE 106 is OOS, actively scanning one or more frequency bands for signals according to one or more RATs according to which the UE 106 is configured to operate. After scanning for a certain period of time, the device may "go to sleep" (e.g., transition to the inactive/sleeping state), and may remain in the inactive state for a certain period of time. Once that period of time has ended, the device may again "wakeup" (e.g., transition to the active/waking state). Once active, the device may further scan one or more frequency bands for signals according to one or more cellular technologies (which may be the same as or different than previously scanned for, e.g., depending on the configuration of the UE 106 and the conditions present) according to which the device is configured to operate. A device may repeat such a pattern of periodic alternating activity and inactivity according to its configuration (e.g., according to a search algorithm) as many (or as few) times as necessary in order to regain service, or until conditions change such that the network search is interrupted.

Thus, as part of each possible search algorithm/configuration, the UE 106 may generally be inactive (e.g., with one or more components, such as radio and/or baseband components, powered down or sleeping) for a portion of the time and actively scanning/searching for cellular service for a portion of the time. The specific scheduling of when to scan (and for how long) and when to sleep (and for how long), and/or more generally the proportion of active-to-sleeping time, may differ according to different possible search algorithms/configurations.

For example, consider the following search algorithm/configuration as an exemplary "balanced" OOS network search configuration. Initially, the UE 106 might actively scan for cellular service for up to 120 seconds (2 minutes). After this initial scan, the UE 106 might sleep for 30 seconds. The UE 106 might then wake up and perform another scan for 15 seconds. The UE 106 might then sleep for a further 60 seconds, then scan for 15 seconds, then sleep for 180 seconds. Subsequent scanning and sleeping periods might then continue in the 15 second scan/180 second sleep arrangement. Note that if cellular signals are detected and cellular service is resumed at any time during the search, the search algorithm may be terminated, as the UE 106 may return to in-service conditions.

As a further example, consider further the following search algorithm/configuration as an exemplary "low-power" OOS network search configuration. Initially, the UE 106 might actively scan for just 15 seconds, instead of 120 seconds. Subsequent sleeping and scanning timing might follow the same arrangement as in the "balanced" approach, i.e., 30 s sleep, 15 s scan, 60 s sleep, 15 s scan, 180 s sleep, etc. Since the initial scan period is greatly reduced relative to the "balanced" approach, the "low-power" approach may result in a higher proportion of time spent sleeping relative to the time spent actively scanning, which may in turn reduce power consumption.

It will be recognized that the above-provided examples represent just two possible network search algorithms/configurations, and that any number of other possible network search algorithms/configurations may alternatively or additionally be defined as desired. Such algorithms/configurations may similarly be "telescoping" search algorithms with increasing periodicity between active scans (i.e., increased durations of periods of sleep between active scans) over time, or may utilize any other desired configuration.

In addition, or as an alternative, it may be possible that the actions performed while actively searching/scanning may differ according to different search algorithms/configurations. For example, more or fewer frequency bands might be scanned according to different search configurations. Further, if configured to communicate according to multiple RATs, a UE 106 might be configured to search for signals according to the different RATs in different proportions and/or according to different schedules (e.g., based on a preference for one or more RATs over one or more other RATs). Other techniques (e.g., for increasing or reducing the aggressiveness and/or the power consumption of the search) may also or alternatively be implemented, as desired.

Selection of a network search algorithm/configuration may be based on conditions currently being experienced by the UE 106 in combination with (user-input based or pre-configured) OOS search behavior configuration of the UE 106. For example, the first network search algorithm/configuration may be selected based on one or more of power reserve levels (e.g., estimated remaining battery life) of the UE 106, current user activity levels (e.g., as indicated by one or more user activity indicators), etc., according to the OOS search behavior configuration settings of the UE 106.

As a specific example, consider that a UE 106 may be configured in step 502 with the condition that if battery reserves are below a first battery level threshold, OOS network searches may be performed according to a "low-power" search algorithm, while if battery reserves are above the first battery level threshold (or if the UE 106 is coupled to an external power source, e.g., charging), OOS network searches may be performed according to a "high-performance" search algorithm.

As a further example, consider that a UE 106 may further be configured in step 502 with multiple conditions, and multiple corresponding search algorithms, based on battery levels of the UE 106. For example, in addition to specifying that OOS network searches may be performed according to the "low-power" search algorithm if battery reserves are below the first battery level threshold, it may be specified that the "high-performance" search algorithm may be selected if battery reserves are above a second battery level threshold (or if the UE 106 is coupled to an external power source, e.g., charging). If batter reserves are between the first battery level threshold and the second battery level threshold, a "balanced" search algorithm might be selected.

As yet another example, consider that a UE 106 may be configured in step 502 with the condition that if user activity indicators are indicating low user activity (for example, if the display is off, the application processor is sleeping, and/or there is no active user-initiated network traffic, among various possibilities), the "low-power" search algorithm may be selected, while if user activity indicators are indicating high user activity (for example, if the display is on, the application processor is active, and/or there is active user-initiated network traffic, among various possibilities) the "high-performance" search algorithm may be selected. As in the case of battery level based conditions, finer levels of granularity with respect to user activity levels may be defined/configured and used as a basis for adaptive network search behavior modification if desired.

Furthermore, combinations of multiple types of conditions may be used as a basis for selecting a search algorithm, if desired. For example, the OOS network search behavior configuration of the UE 106 might specify that if both battery reserves are below the first battery level threshold and user activity indicators are indicating low user activity, a search algorithm specific to that combination of conditions (e.g., a very low power search algorithm) may be selected. In this case selection of different search algorithms might be specified if battery reserves are below the first battery level threshold but user activity indicators are indicating high user activity, and/or if battery reserves are above the first battery level threshold but user activity indicators are indicating low user activity. In other words, the UE 106 may be configured to adaptively modify its OOS network search behavior in any of a wide variety of ways, according to any of a wide variety of configurations, as desired.

Furthermore, while as noted above it may be possible for user input to be received in order to initially configure (e.g., pre-configure) the parameters of the OOS network search behavior of the UE 106, it may also or alternatively be possible for user input to be received which instantaneously selects or modifies the OOS network search behavior of the UE 106. For example, if a user of the UE 106 knows that they are in an area with spotty cellular service such that it may be expected that the UE 106 may go back-and-forth between in-service and OOS situations, the user may decide that it would be preferable to reduce the amount of battery consumed by the frequent OOS network searches which may occur in such conditions. As another example, if a user of the UE 106 urgently needs or wants to make a phone call, they may prefer that the UE 106 aggressively search for cellular service even if battery reserves are relatively low. In order to provide users with the option to instantaneously modify the OOS search behavior of their UE 106, a user interface option might be presented prompting the user as to their preferred OOS search behavior (e.g., in response to determining that the UE 106 is OOS, and/or based on user input to a menu or series of menus requesting OOS search behavior configuration options, among various possibilities), such that the user could provide user input selecting a network search algorithm/configuration directly in response to going OOS.

In 510, a network search may be performed according to the selected network search algorithm. As noted above, this may include alternately actively scanning one or more frequency bands for cellular signals according to one or more cellular RATs (e.g., depending on the configuration of the UE 106) and sleeping. The selected network search algorithm may specify for how long and with what periodicity and/or scheduling to scan for cellular service and for how long and with what periodicity and/or scheduling to sleep.

In 512, it may be determined that a condition for modifying the OOS search configuration has occurred. The condition may be a change in current conditions experienced by the UE 106 which triggers a modification to the OOS search configuration of the UE 106 according to a pre-configured condition for adaptively modifying OOS search behavior of the UE, such as battery reserve levels of the UE 106 falling below a pre-defined battery level threshold or the UE 106 being coupled to an external power source (e.g., a charging station), or changes to user activity level indicators (e.g., a display being powered on, an application processor waking up, attempted user initiation of a data transfer. Alternatively, the condition may be a user-input initiated change to the pre-configured condition(s) for adaptively modifying OOS search behavior of the UE such that while current conditions experienced by the UE 106 may not have changed, those current conditions may specify a different OOS search configuration as a result of the user-input initiated change. For example, the user input might change the battery level threshold below which OOS search behavior of the UE is modified, or change which user activity indicators are used in determining OOS search behavior of the UE, such that a different network search algorithm would be specified by the current conditions experienced by the UE 106 than prior to the change. As a further possibility, the condition may be receipt of user input explicitly specifying a modification of the OOS search configuration of the UE 106. For example, a user might decide to temporarily override the network search algorithm specified by the pre-configured condition(s) for adaptively modifying OOS search behavior of the UE with a different network search algorithm.

In 514, a new ("second") network search algorithm/configuration may be selected (or the original network search algorithm/configuration may be modified) based on occurrence of the condition for modifying the OOS search configuration. For example, if the condition that has occurred is that battery reserves of the UE have fallen below a specified battery level threshold, the second network search algorithm may be a search configuration which consumes less power than the first search configuration. For example, the second network search algorithm might be the exemplary "low-power" search configuration described above, while the first network search algorithm might be the exemplary "balanced" search configuration described above. Alternatively, the first and second network search algorithms/configurations may be any of various other search configurations.

In 516, the network search may be performed according to the second (modified/new) network search algorithm/configuration. This may include reducing (or increasing) the ratio of scan time to sleep time specified by the second network search algorithm/configuration relative to the first network search algorithm/configuration, e.g., depending on what condition triggered the modification of the OOS search configuration (and correspondingly whether a more- or less-aggressive search would be appropriate). In other words, the second search configuration may specify a lesser (or greater) proportion of search time to sleep time than the first search configuration.

Note that if desired, the OOS network search may be updated/modified to correspond to the newly selected second network search algorithm/configuration during an ongoing OOS network search. This may be desirable, for example, if the newly selected second network search algorithm/configuration is a more aggressive (designed to regain service more quickly) search algorithm than the first network search algorithm/configuration. In this case, it may be desirable to implement the second network search algorithm/configuration as soon as possible, in order to regain service as quickly as possible.

However, it is also possible that a change or modification to the OOS network search configuration of the UE 106 may not cause an interruption and restart of an ongoing OOS network search; for example, such a condition as described with respect to step 512 may trigger the implementation of the second network search algorithm/configuration selected as described with respect to step 514 only for future OOS network searches (e.g., if the UE 106 were to obtain service, but then go OOS again). This may be desirable, for example, if the newly selected second network search algorithm/configuration is a less aggressive search algorithm than the first network search algorithm/configuration, and if both the first and second network search algorithm are telescopic network search algorithms with a configuration such that the initial portion of the second network search algorithm/configuration would in fact consume more power than the latter stages of the first network search algorithm/configuration.

Thus, it may in some cases be desirable to implement some updates to the network search configuration of the UE 106 immediately while implementing other updates in a manner which doesn't interrupt ongoing network searches. However, it should be recognized that any of various other techniques for implementing updates to the network search configuration of the UE 106 may be used, as desired.

It should also be noted that any number of subsequent (similar or different) conditions for modifying the OOS network search behavior of the UE 106 may subsequently occur, and that appropriate network search algorithms/configurations may correspondingly subsequently be selected and performed in response to any such further occurrences, in an ongoing manner.

Thus, the UE 106 may adaptively modify its OOS network search behavior over time, in particular based on conditions being experienced by the UE 106 over time, and potentially in combination with default- or user-input-based configuration of the UE 106, and/or based on user input instantaneously modifying the OOS network search behavior at various times.

By adaptively modifying the OOS network search behavior in such a manner, a UE 106 may be able to balance the trade-offs between improved performance and increased battery life. In particular, by reducing the aggressiveness (and thus the power consumed) of OOS network searches when battery levels are low, the UE 106 may be able to conserve battery life when it is likely to be an important consideration to a positive user experience. Similarly, by increasing the aggressiveness of OOS network searches when battery levels are relatively high, the UE 106 may be able to provide a higher-quality user experience without immediate risk of being forced to power down. Further, by providing the ability to adaptively modify the OOS network search behavior based on further considerations, such as user activity level indicators and explicit user input, the UE 106 may be able to further refine its performance to account for the preference of its user(s).

Figure 6:
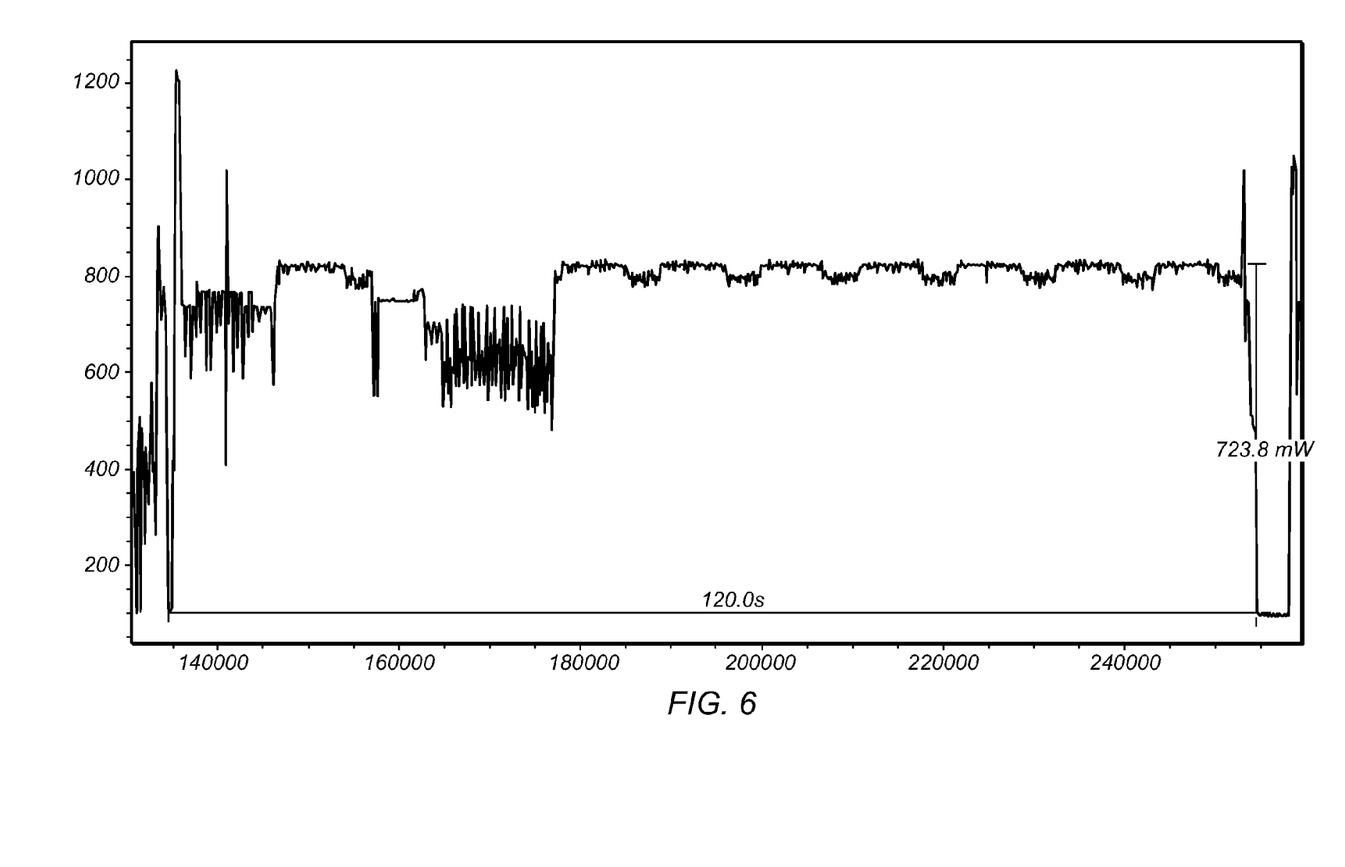
FIG. 6 is a graph illustrating power consumption during an exemplary service scan.

FIG. 6—Power Consumption of an OOS Search

FIG. 6 is a graph illustrating exemplary power consumption of an active scan for cellular service according to one possible scenario. In particular, the scenario shown may correspond to a 120 s initial scan for service after going OOS, such as might be performed according to one possible OOS network search configuration. As shown, the device for which the exemplary power consumption is illustrated in FIG. 6 may consume approximately ~720 mW on average during the active scan for cellular service.

In contrast, if (e.g., according to a different OOS network search configuration) the device were to perform its initial search for just 15 s, then sleep for 30 s, then scan for another 15 s, then sleep for another 60 s, those initial 120 s of the OOS network search would consume significantly less power, as the device would be actively scanning for just 30 s of those 120 s instead of the entire 120 s.

Note that according to some configurations (e.g., multi-RAT capable devices), "sleeping" times according to one RAT may be used to actively scan for cellular service according to another RAT. For example, in an exemplary LTE/1xRTT implementation, scans for 1 xRTT might be performed according to the above-described OOS network search configurations, and scans (e.g., of relatively short duration) for LTE (and possibly also HDR) may be performed during the "sleeping" periods according to 1xRTT.

It should be noted that the exemplary power consumption graph illustrated in FIG. 6, as well as the alternative OOS network search configurations described above with respect to FIG. 6, are provided by way of example only, and are not intended to be limiting to the disclosure as a whole. Numerous other configurations and power consumption expectations and results are also possible.

Figure 7:
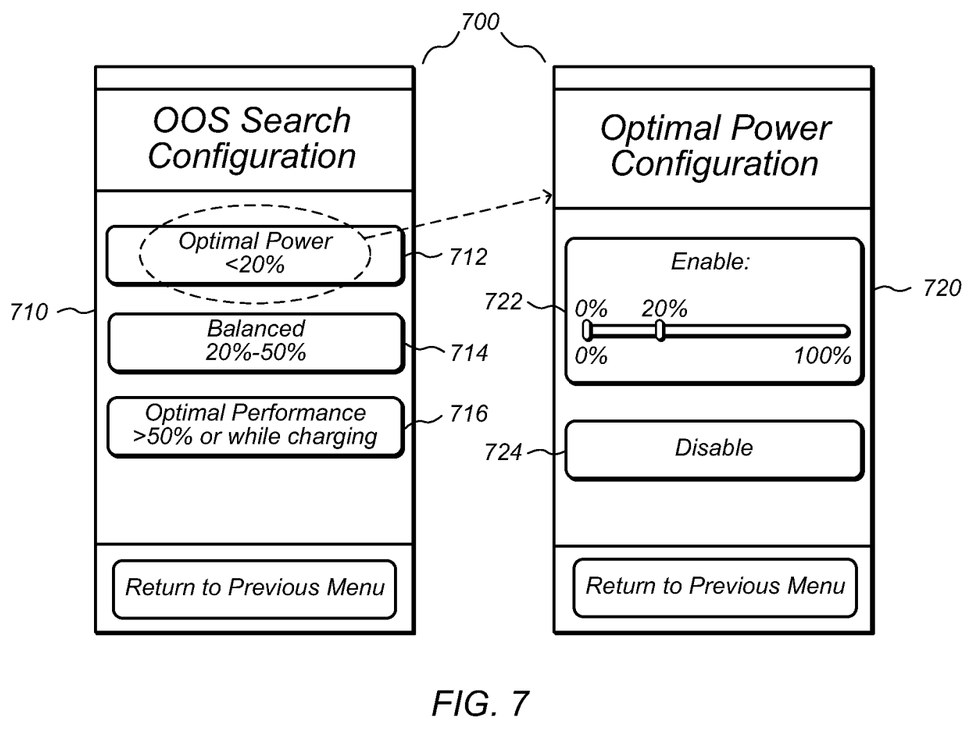
FIG. 7 illustrates an exemplary user interface for receiving input configuring adaptive OOS network search behavior of a UE.

FIG. 7—Exemplary User Interface

FIG. 7 illustrates exemplary user interface options for providing features for OOS network search behavior configuration. As shown, a user interface may be displayed on a display 700 of a device (e.g., a UE 106), which may be a touch-screen display. A menu 710 for OOS search configuration options may be provided to users via the display 700. The menu 710 may be provided in response to previous user input requesting (e.g., via one or more previous menus) the OOS search configuration options menu, or based on any of a variety of other factors.

As shown, the menu 710 may present buttons for each of one or more OOS search configurations/algorithms (e.g., by names representing their characteristics, such as "optimal power" (or "low power"), "balanced", "optimal performance" (or "high performance"), etc. By selecting a button corresponding to one of the OOS search configurations/algorithms, the user may be presented with a further menu for configuring under what (if any) conditions that particular OOS search configuration/algorithm may be implemented. For example, as shown in FIG. 7, if the "Optimal Power" button 712 is selected, a menu 720 for configuring whether to enable (e.g., via an "enable" button 722) or disable (e.g., via a "disable" button 724) the "Optimal Power" algorithm, and if enabled, at what battery level range the algorithm will be implemented, may be presented via the display 700. If desired, modifications to the configuration of one OOS search algorithm may automatically be reflected in other OOS search algorithms. For example, if a user adjusts a battery level range at which the "Optimal Power" algorithm is implemented, the battery level range of the "Balanced" algorithm might automatically be adjusted such that one and only one algorithm is specified for each battery level range (e.g., such that an algorithm is specified for all battery levels in a continuous, non-overlapping manner).

Once a setting (e.g., "disabled", or "enabled" with a specified battery level range) is selected, the user may return to the OOS search configuration menu 710 and select the "Balanced" button 714 and/or the "Optimal Performance" button 716, and configure those algorithms according to their preferences in a similar manner.

Note that while the exemplary user interfaces and user interface options illustrated in FIG. 7 represent possible options for user interface elements by means of which user input configuring adaptive OOS network search behavior may be received, any number of other types of user interfaces and user interface options are also possible.

For example, a UE 106 might be configured to provide options for more or less OOS search algorithms, for specifying details of the OOS search algorithms themselves, for configuring other conditions in addition to or instead of battery level under which an OOS search algorithm may be implemented, for explicitly selecting an OOS search algorithm (e.g., on a temporary and/or instantaneous basis), and/or any of various other options.

Furthermore, a UE 106 might be configured to utilize any of a variety of user interface elements, individually or in combination, to provide such options for prompting and receiving input with respect to OOS network search behavior configuration. For example, any or all of a display, touchscreen, touchpad, mouse, keyboard, camera, microphone, speaker, buttons/dials/sliders/etc., proximity sensing elements, and/or any of various other elements capable of providing information to a user and/or receiving/interpreting user input may be used to provide user interface features in conjunction with the features described herein according to various embodiments.

Embodiments of the present disclosure may be realized in any of various forms. For example some embodiments may be realized as a computer-implemented method, a computer-readable memory medium, or a computer system. Other embodiments may be realized using one or more custom-designed hardware devices such as ASICs. Still other embodiments may be realized using one or more programmable hardware elements such as FPGAs.

In some embodiments, a non-transitory computer-readable memory medium may be configured so that it stores program instructions and/or data, where the program instructions, if executed by a computer system, cause the computer system to perform a method, e.g., any of a method embodiments described herein, or, any combination of the method embodiments described herein, or, any subset of any of the method embodiments described herein, or, any combination of such subsets.

In some embodiments, a device (e.g., a UE 106) may be configured to include a processor (or a set of processors) and a memory medium, where the memory medium stores program instructions, where the processor is configured to read and execute the program instructions from the memory medium, where the program instructions are executable to implement any of the various method embodiments described herein (or, any combination of the method embodiments described herein, or, any subset of any of the method embodiments described herein, or, any combination of such subsets). The device may be realized in any of various forms.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A non-transitory computer accessible memory medium comprising program instructions which, when executed at a wireless user equipment (UE) device, cause the UE to:
   perform cellular communications according to a first radio access technology (RAT);
   determine that cellular service according to the first RAT is not available;
   determine a user activity level of the UE;
   select a first search algorithm from at least two possible search algorithms, wherein the first search algorithm is selected based at least in part on the determined user activity level of the UE;
   perform a first search for cellular service according to the first RAT, wherein the first search is performed according to the first search algorithm;
   after selection of the first search algorithm, determine that one or more pre-configured conditions for modifying out-of-service search behavior of the UE have occurred, wherein the one or more pre-configured conditions comprise one or more of:
      crossing a pre-configured estimated remaining battery life threshold; or
      receiving user input specifying a modification of out-of-service search behavior of the UE;
   select a second search algorithm from the at least two possible search algorithms based on the one or more pre-configured conditions having occurred; and
   interrupt the first search and initiate a second search for cellular service according to the first RAT, wherein the second search is performed according to the second search algorithm.

2. The memory medium of claim 1, wherein the user activity level is determined based on one or more user activity level indicators, wherein the one or more user activity level indicators comprise one or more of:
   a state of a display of the UE;
   a state of an application processor of the UE; or
   presence or absence of active user-initiated data transfers.

3. The memory medium of claim 1, wherein the program instructions further cause the UE to:
   estimate remaining battery life of the UE;
   wherein the first search algorithm is selected based at least in part on the estimated remaining battery life of the UE.

4. The memory medium of claim 1, wherein the program instructions further cause the UE to:
   receive user input via a user interface;
   wherein the first search algorithm is selected based at least in part on the received user input.

5. The memory medium of claim 1,
   wherein the first search algorithm and the second search algorithm each specify that the UE alternately scan for cellular service according to the first RAT and sleep,
   wherein the first search algorithm specifies a higher ratio of time spent scanning for cellular service to time spent sleeping than the second search algorithm.

6. A wireless user equipment (UE) device, the UE comprising:
   a radio, comprising one or more antennas for performing wireless communication;
   a processing element operably coupled to the radio;
   wherein the radio and the processing element are configured to:
      establish a wireless link with a base station, wherein the base station acts as a serving cell for the UE;
      determine that the wireless link with the base station has been broken;
      perform a search for cellular service according to a first search configuration based on determining that the wireless link with the base station has been broken, wherein the first search configuration is selected based at least in part on a determined user activity level of the UE;
      detect a first pre-configured condition for modifying the first search configuration, wherein the first pre-configured condition comprises one or more of:
         user activity crossing a user activity threshold;
         battery level crossing a battery level threshold; and/or
         receiving user input specifying a modification of out-of-service search behavior of the UE; and
      perform a search for cellular service according to a second search configuration based on detecting the first pre-configured condition for modifying the search configuration.

7. The UE of claim 6,
   wherein the UE is configured to detect the first pre-configured condition based on one or more user activity level indicators, wherein the one or more user activity level indicators comprise one or more of:
   a state of an application processor of the UE; or
   presence or absence of active user-initiated data transfers.

8. The UE of claim 6,
   wherein the second search configuration specifies a lesser proportion of search time to sleep time than the first search configuration.

9. The UE of claim 6, wherein the radio and the processing element are further configured to:
  detect a second pre-configured condition for modifying the search configuration; and
  perform a search for cellular service according to a third search configuration based on detecting the second pre-configured condition for modifying the search configuration.

10. A method for operating a wireless user equipment (UE) device, the method comprising:
  detecting an out-of-service (OOS) condition;
  at a first time:
    detecting a first pre-configured condition for modifying the search configuration, wherein the first pre-configured condition comprises one or more of:
      determining that the user activity level of the UE is above or below a first threshold; and/or
      determining whether battery level of the UE is above or below a battery level threshold;
    performing a search for cellular service in a first manner based on determining the first preconfigured condition; and
  at a second time:
    detecting a different one of the first pre-configured conditions; and
    performing a search for cellular service in a second manner based on detecting a different one of the first pre-configured conditions.

11. The method of claim 10,
  wherein performing a search for cellular service comprises alternately scanning one or more frequency bands for cellular signals and sleeping according to a pre-configured schedule,
  wherein a larger proportion of time is spent sleeping while performing a search for cellular service in the second manner than while performing a search for cellular service in the first manner.

12. The method of claim 10, wherein the method further comprises:
  receiving user input configuring at least one condition for adaptively modifying OOS search behavior of the UE; and
  receiving user input configuring at least two search configurations for performing OOS network searches.

13. The method of claim 12,
  wherein the at least one condition comprises the user activity level of the UE crossing a first threshold.

14. The method of claim 13,
  wherein the at least one condition is based on one or more user activity level indicators, wherein the one or more user activity level indicators comprise one or more of:
  a state of a display of the UE;
  a state of an application processor of the UE; or
  presence or absence of active user-initiated data transfers.

15. The method of claim 12,
  wherein performing the search for cellular service in the first manner at the first time comprises utilizing a first search configuration of the at least two search configurations, wherein performing the search for cellular service in the second manner at the second time comprises utilizing a second search configuration of the at least two search configurations.

16. The method of claim 12, the method further comprising:
  receiving user input re-configuring one or more of the at least one condition for adaptively modifying OOS search behavior of the UE or the at least two search configurations for performing OOS network searches;
  performing subsequent OOS network searches according to the re-configured at least one condition for adaptively modifying OOS search behavior of the UE and at least two search configurations for performing OOS network searches.

\* \* \* \* \*